(12) United States Patent
Scriber et al.

(10) Patent No.: US 11,283,625 B2
(45) Date of Patent: Mar. 22, 2022

(54) SYSTEMS AND METHODS FOR BOOTSTRAPPING ECOSYSTEM CERTIFICATE ISSUANCE

(71) Applicant: CABLE TELEVISION LABORATORIES, INC, Louisville, CO (US)

(72) Inventors: Brian Alexander Scriber, Denver, CO (US); Ronald H. Ih, Los Altos, CA (US); Stuart Hoggan, Providence, UT (US)

(73) Assignee: Cable Television Laboratories, Inc., Louisville, CO (US)

( * ) Notice: Subject to any disclaimer, the term of this patent is extended or adjusted under 35 U.S.C. 154(b) by 616 days.

(21) Appl. No.: 15/909,586

(22) Filed: Mar. 1, 2018

(65) Prior Publication Data
US 2018/0191508 A1 Jul. 5, 2018

Related U.S. Application Data

(63) Continuation-in-part of application No. 15/784,845, filed on Oct. 16, 2017.
(Continued)

(51) Int. Cl.
*H04L 9/32* (2006.01)
*H04L 9/08* (2006.01)
(Continued)

(52) U.S. Cl.
CPC ......... *H04L 9/3263* (2013.01); *G06Q 20/102* (2013.01); *G06Q 20/3829* (2013.01);
(Continued)

(58) Field of Classification Search
CPC ..... H04L 9/3263; H04L 9/0861; H04L 9/321; H04L 9/3247; H04L 9/3268;
(Continued)

(56) References Cited

U.S. PATENT DOCUMENTS

| 2013/0086385 A1* | 4/2013 | Poeluev | H04L 9/3252 |
| | | | 713/176 |
| 2013/0117560 A1* | 5/2013 | Resch | H04L 9/3265 |
| | | | 713/157 |

(Continued)

*Primary Examiner* — Jay Huang
*Assistant Examiner* — Courtney P Jones
(74) *Attorney, Agent, or Firm* — Armstrong Teasdale LLP

(57) ABSTRACT

An ecosystem for managing a public key infrastructure (PKI) includes an electronic device having at least one silicon component, an ecosystem manager configured to create at least one PKI keypair, a root certificate, and a bootstrapping certificate, and a device manufacturer configured to integrate into the electronic device the at least one silicon component. The device manufacturer is further configured to integrate into the at least one silicon component a public key of the at least one PKI keypair and the bootstrapping certificate. The ecosystem further includes an ecosystem approved test lab (ATL) configured to test the electronic device having the integrated silicon component, the public key, and the bootstrapping certificate. The ecosystem ATL is further configured to confirm that the bootstrapping certificate complies with predetermined standards of the ecosystem.

19 Claims, 4 Drawing Sheets

Related U.S. Application Data

(60) Provisional application No. 62/465,261, filed on Mar. 1, 2017, provisional application No. 62/408,567, filed on Oct. 14, 2016.

(51) Int. Cl.
*H04L 29/06* (2006.01)
*G06Q 20/38* (2012.01)
*G06Q 20/10* (2012.01)
*H04W 12/30* (2021.01)
*H04W 12/0431* (2021.01)
*G06F 21/57* (2013.01)

(52) U.S. Cl.
CPC ............ *H04L 9/0861* (2013.01); *H04L 9/321* (2013.01); *H04L 9/3247* (2013.01); *H04L 9/3268* (2013.01); *H04L 63/0823* (2013.01); *H04W 12/0431* (2021.01); *H04W 12/35* (2021.01); *G06F 21/575* (2013.01); *H04L 2209/127* (2013.01)

(58) Field of Classification Search
CPC ....... H04W 12/04031; H04W 12/0023; G06Q 20/3829; G06Q 20/102
See application file for complete search history.

(56) References Cited

U.S. PATENT DOCUMENTS

| | | | |
|---|---|---|---|
| 2014/0044265 A1* | 2/2014 | Kocher | H04L 9/3247 380/277 |
| 2015/0326543 A1* | 11/2015 | Pochuev | G06F 21/57 713/155 |
| 2016/0234628 A1* | 8/2016 | Rahman | H04L 12/2809 |
| 2017/0295491 A1* | 10/2017 | Gehrmann | H04W 4/70 |
| 2018/0375667 A1* | 12/2018 | Sovio | G06F 21/44 |

* cited by examiner

SYSTEMS AND METHODS FOR BOOTSTRAPPING ECOSYSTEM CERTIFICATE ISSUANCE

CROSS REFERENCE TO RELATED APPLICATIONS

This application is a continuation-in-part of U.S. patent application Ser. No. 15/784,845, filed Oct. 16, 2017, which claims the benefit of and priority to U.S. Provisional Patent Application Ser. No. 62/408,567, filed Oct. 14, 2016. This application also claims the benefit of and priority to U.S. Provisional Patent Application Ser. No. 62/465,261, filed Mar. 1, 2017. The disclosures of all of these prior applications are incorporated herein by reference in their entireties.

BACKGROUND

The field of the disclosure relates generally to management of device registration, and more particularly, to management of public and private keys and/or certificates through an ecosystems.

Many conventional electronic devices utilize a Public Key Infrastructure (PKI) to validate an electronic signature of the device in a variety of technology fields, such as telecommunications (e.g., mobile communication devices), the Internet of Things (IoT), online banking, secure email, and e-commerce. PKI uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PKI includes policies and procedures for encrypting public keys, as well as the creation, management, distribution, usage, storage, and revocation of digital certificates. The PKI binds the public keys to the identity of a person or legal entity, typically through a trusted Certificate Authority (CA). The PKI hierarchy identifies a chain of trust for a device or program, and further may provide secure software download requirements for the devices, and/or secure certificate injection requirements on the device manufacturers. The CA, the electronic devices, the device manufacturers, and users of the device interact over a PKI ecosystem.

In conventional PKI ecosystems, however the management of keys, as well as the process of inserting keys into the devices, is problematic, expensive, and difficult to audit. Due to these difficulties, device manufacturers that utilize PKI are today required to add PKI costs to the bill of materials of each device at the time of manufacture, irrespective of whether the device may be eventually sold to/activated by a consumer. The security benefits provided to the device are considered to outweigh the risk of purchasing a PKI keypair that might not be sold. The PKI security is required to meet compliance guidelines, by regulatory bodies in industry, for the particular ecosystem requirements, for market purposes. Nevertheless, the risk of not recouping the PKI bill of materials investment, which is often compounded by the inability of the device manufacturers to charge a premium for the added security, has been an obstacle to the utilization of PKI by many industries.

Furthermore, many conventional IoT devices may be deployed in more than one existing ecosystem (e.g., Open Connectivity Foundation (OCF), AllSeen/AllJoyn, Nest/Thread, Zigbee, etc.), and a different key is inserted on such devices for each ecosystem into which deployment is desired. The manufacturers of such conventional devices must add to the PKI bill of materials the cost for each such inserted keypair, even if the device may never be activated in more than one (or any) of the corresponding ecosystems. Thus, some IoT devices are manufactured to be deployable only within particular ecosystems. Accordingly, it is desirable to have a PKI management system that enables device manufacturers to audit which inserted keypairs are actually being activated by a consumer, and to be invoiced only for registrations and/or certificates that have actually been issued by an ecosystem CA.

BRIEF SUMMARY

In an aspect, an ecosystem for managing a public key infrastructure (PKI) includes an electronic device having at least one silicon component, an ecosystem manager configured to create at least one PKI keypair, a root certificate, and a bootstrapping certificate, and a device manufacturer configured to integrate into the electronic device the at least one silicon component. The device manufacturer is further configured to integrate into the at least one silicon component a public key of the at least one PKI keypair and the bootstrapping certificate. The ecosystem further includes an ecosystem approved test lab (ATL) configured to test the electronic device having the integrated silicon component, the public key, and the bootstrapping certificate. The ecosystem ATL is further configured to confirm that the bootstrapping certificate complies with predetermined standards of the ecosystem.

In an aspect, a method is provided for issuing a bootstrapping certificate for an electronic device in an ecosystem in which the device is deployed. The method includes a step of generating a public key infrastructure (PKI) keypair and a root certificate. The PKI keypair includes a public key and a private key. The method further includes steps of chaining at least one bootstrapping certificate to the root certificate, inserting the bootstrapping certificate and the public key into a silicon component, integrating the silicon component into the electronic device, testing the electronic device to certify that the inserted bootstrapping certificate is valid, and provisioning the electronic device having a certified bootstrapping certificate for deployment in the ecosystem.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
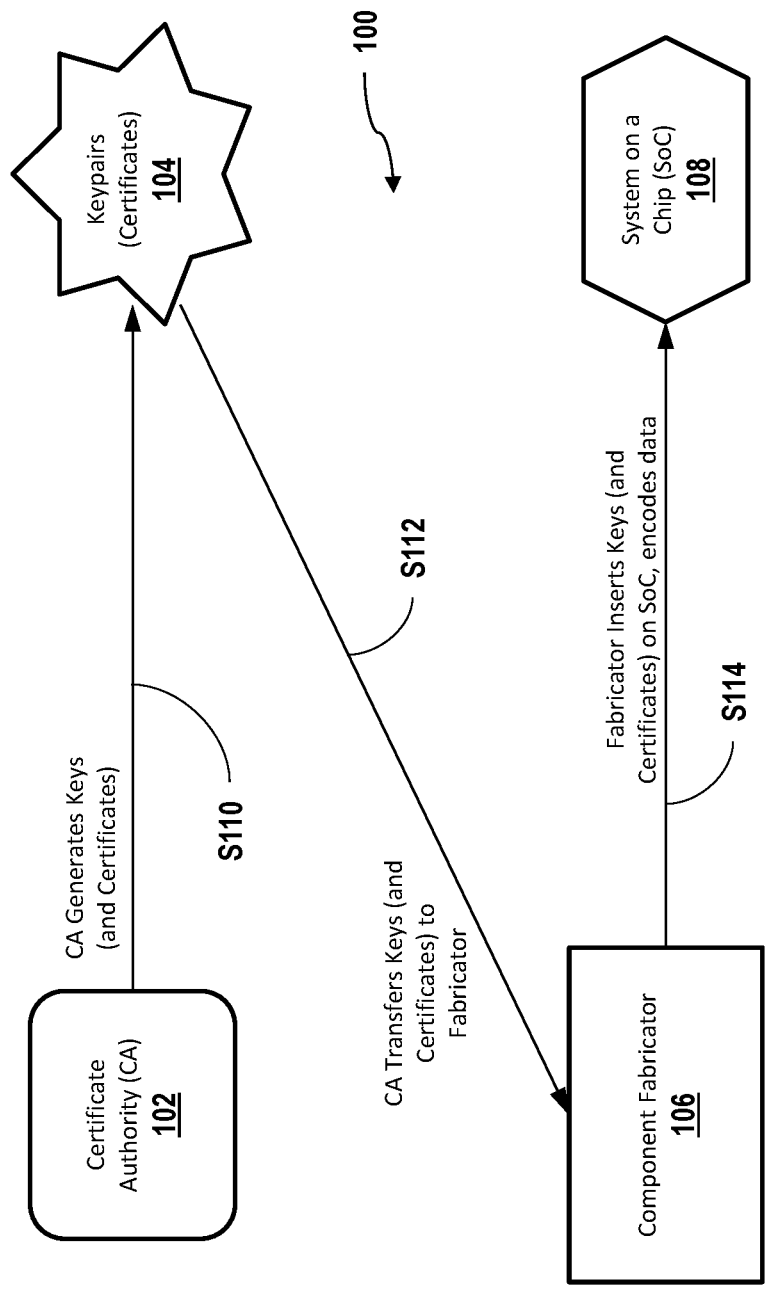
FIG. 1 is a schematic illustration of a keypair generation process, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide systems and methods for modifying a PKI validation process to also verify the status of a device during device registration validation of certificate chains. In an exemplary embodiment, a device is monitored as it transitions, during registration, from a "not in use" or "invalid" state to a state where the device is both "in use" and "valid." An appropriately manufactured device may be, for example, "valid," but not "in use" (e.g., activated by a consumer) prior to sale from the manufacturer to the consumer. According to these advantageous techniques, registration, billing, and ecosystem selection may be more reliably performed for a PKI device after the device has been purchased. That is, the present systems and methods implement a verifiable post-hoc decision process, which significantly improves over conventional manufacturing processes, which require a priori guesswork.

In an exemplary embodiment, the present systems and methods utilize an X.509 trust model, in which a trusted third party CA is responsible for signing digital certificates. Accordingly, as described herein, the CA is presumed to have capability to store one or more trusted root certificates (or intermediate certificates) as well as the corresponding private keys. The CA is further responsible for maintaining up-to-date revocation information regarding the validity of issued certificates, and will provide information to the other parties, for example, through an Online Certificate Status Protocol (OCSP). In some embodiments, the CA may provide information according to a Certificate Revocation List (CRL). The OCSP is an Internet protocol for obtaining a revocation status of an X.509 digital certificate, and is generally considered an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

In exemplary operation, the CA issues PKI certificates and public keys to the ecosystem members. The CA receives OCSP request messages from the ecosystem members and confirms the revocation status of a corresponding certificate (e.g., stored in the trusted database of the CA), and the OCSP responder of the CA transmits an OCSP response message indicating the revocation status (e.g., "valid," "revoked," "unknown," etc., or an error message if the request message may not be processed). The present systems and methods improve upon conventional CA operation by providing a data capture trigger capability or mechanism to the OCSP responder, and an aggregation capability/mechanism to the database. In some embodiments, these additional elements are further coupled with a Customer Relationship Management (CRM) unit of the CA.

In the exemplary embodiment, the CA generates or records the issuance of the public/private keypairs. In some embodiments, the CA further optionally generates/records the certificates associated with the keypairs. Whereas, in conventional systems, the CA charges a device manufacturer up-front for the keypair issuance operation, in the exemplary embodiment such up-front payments are advantageously adjustable to a particular arrangement between, for example, the device manufacturer and the CA. That is, up-front charges/payments may be, at the time of key creation, full, partial, or none. In some embodiments, the created keys constitute a single keypair. In other embodiments, the created keys are multiple keypairs for different ecosystems.

In the exemplary embodiment, the keypair(s), as well as the optional certificates, is(are) to inserted or generated on a System on a Chip (SoC) prior to any secondary inclusion of the SoC into a manufactured device, that is, at the time of SoC manufacture. For example, a device manufacturer or integrator may purchase a previously-manufactured SoC, and integrate the secure element thereof (e.g., along with the associated credentials) in the final design of the finished device. Subsequently, when the device is purchased (e.g., by a consumer), its packaging removed, and installed within an ecosystem network, the PKI protocol for the device will validate the keys and, optionally, the associated certificate(s).

In exemplary operation, during the validation process of the PKI protocol, a specially-formatted message is transmitted to the OCSP responder. The OCSP responder may then trigger, at the time of device registration, an entry in a certificate database of the CA to capture particular status information of the device, including without limitation, data for the date/time of registration, a serial number device, the device batch number, SoC batch numbers, and SoC manufacturing date. In some operations, this data capturing mechanism may further trigger, during the registration process, the capture of consumer/user information, such as name, address, contact information, etc. In an exemplary embodiment, this additional captured data is aggregated and entered into a table of the CA database. In some embodiments, and aggregation mechanism further registers whether the device activation has met a predetermined threshold for minimum number of device registrations. The collected activation data may then be further aggregated into a billing system (e.g., the CRM) so that an invoice may be created to transmit to the device manufacturer for payment of the actual number of device activations/registrations.

FIG. 1 is a schematic illustration of a keypair generation process 100. Process 100 is implemented with respect to a CA 102, which generates one or more keypairs 104 for transfer to a component fabricator 106 for insertion/installation on an SoC 108. In exemplary operation, process 100 begins at step S110, in which CA 102 generates one or more keypairs 104. In at least one example of step S110, CA 102 further generates corresponding certificates (e.g., X.509 certificates) associated with generated keypair(s) 104. In step S112, CA 102 transfers keypair(s) 104 to component fabricator 106. In step S114, component fabricator 106 inserts keypair(s) 104 into SoC 108. In at least one example of step S114, along with the insertion of keypair(s) 104, SoC 108 further includes encoded identification data particular to SoC 108, including one or more of the batch numbers, the manufacturing date, and identifying information for component fabricator 106. In a further example of step S114, SoC 108 further includes encoded status data, e.g., "inactive," "integrated," "activated," "recycled," etc.

Figure 2:
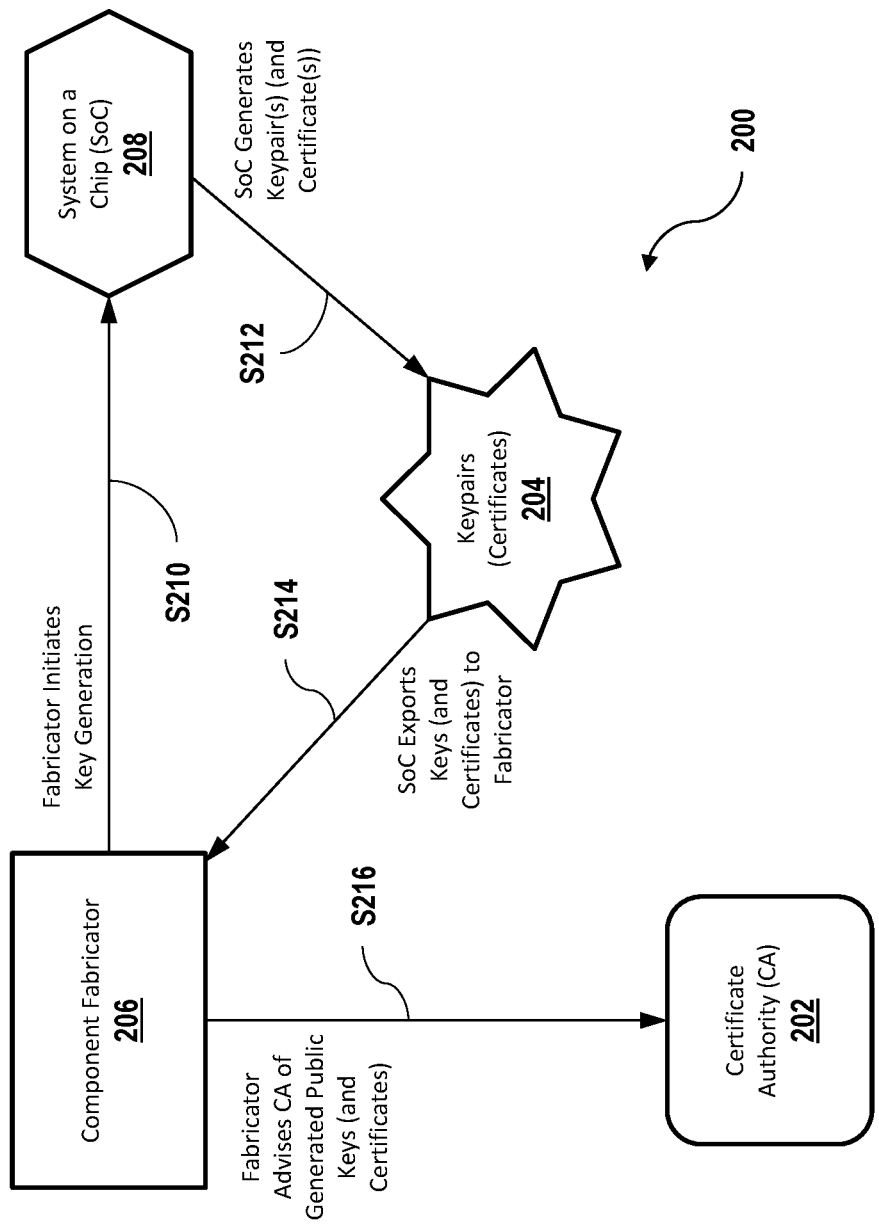
FIG. 2 is a schematic illustration of a keypair generation process, according to an alternative embodiment.

FIG. 2 is a schematic illustration of a keypair generation process 200. Process 200 is similar to process 100, FIG. 1, in that process 200 is implemented with respect to a CA 202, which generates one or more keypairs 204 for transfer to a component fabricator 206 for insertion/installation on an SoC 208. Process 200 differs though, from process 100, in that keypair(s) 204 in process 200 are generated by SoC 208, whereas in process 100, keypair(s) 104 are generated by CA 102.

In exemplary operation, process 200 begins at step S210, in which component fabricator 206 initiates key generation onto SoC 208. In at least one example of step S210, component fabricator 206 further initiates the generation of certificates that may also be encoded onto SoC 208. In step S212, SoC 208 generates one or more keypairs 204, as well as the optional certificates. In step S214, SoC 208 exports generated keypair(s) 204 and optional certificates to a computer system (not shown) of component fabricator 206 for recording into a memory thereof (also not shown). In at least one example of step S214, along with the exported keypair(s) 204 and certificates, the computer system memory of component fabricator 206 further includes manufacturing identification data relevant to SoC 208, including one or more of the batch numbers, the manufacturing date, as well as SoC status data. In step S216, component fabricator 206 advises CA 202 of any public keys (and optional certificates) for the keypair(s) 204 generated by SoC 208. In at least one example of step S216, along with the public keys and certificates, component fabricator 206 further communicates to CA 202 SoC status data, and optionally identifying information of component fabricator 206 (e.g., a digitally signed hash, etc.).

Figure 3:
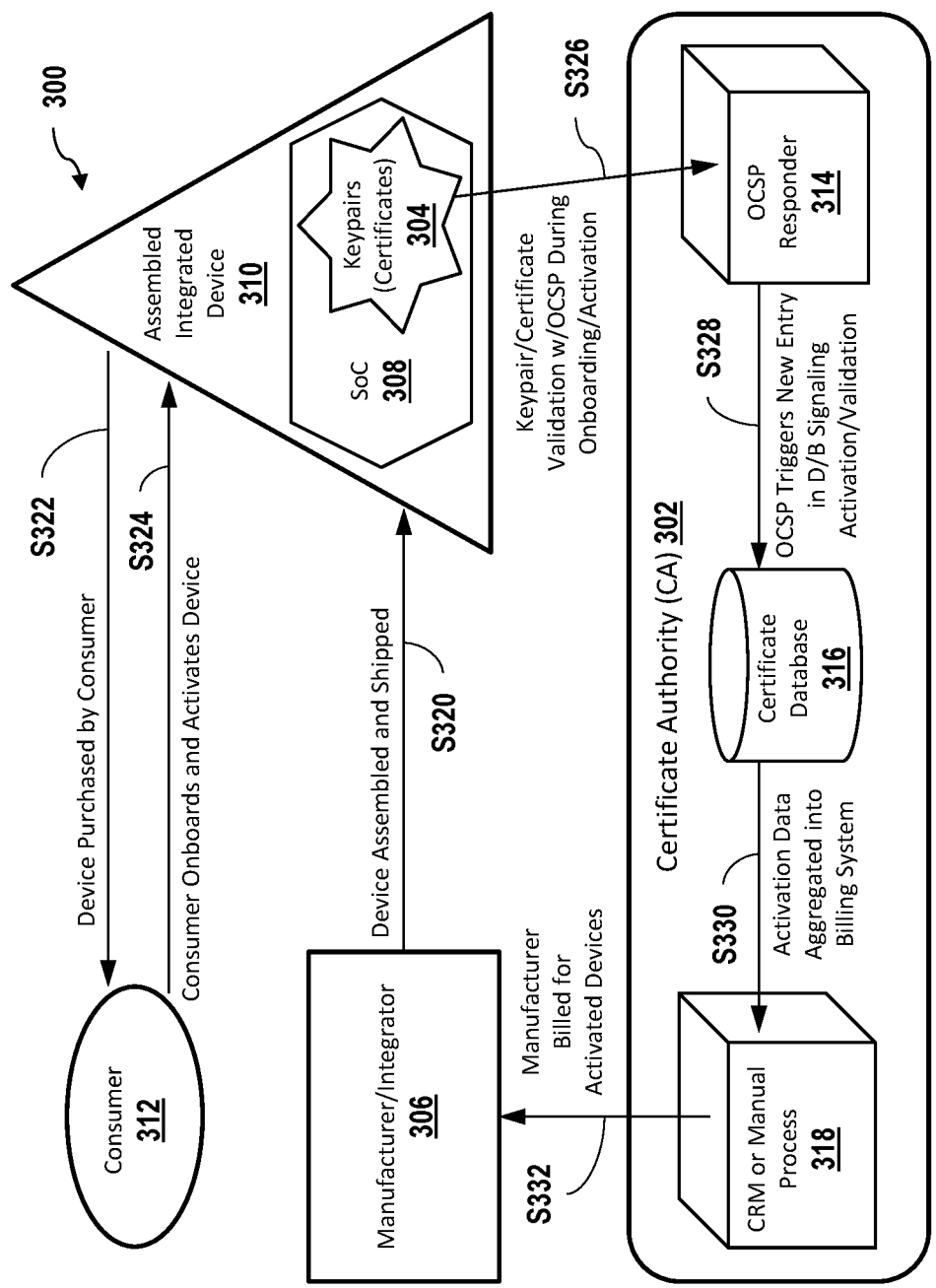
FIG. 3 is a schematic illustration of a registration ecosystem for implementing the embodiments depicted in FIGS. 1 and 2.

FIG. 3 is a schematic illustration of registration ecosystem 300 for implementing process 100, FIG. 1 and/or process 200, FIG. 2. In the exemplary embodiment, ecosystem 300 includes elements common to processes 100 and 200, such as a CA 302, one or more generated keypairs 304 for transfer to a device manufacturer or integrator 306, and an SoC 308. In the exemplary embodiment, device manufacturer 306 is the fabricator of SoC 308. Alternatively, device manufacturer 306 functions to integrate SoC 308 as a previously-manufactured component from a separate component fabricator, and CA 302 is advised of generated public keys/certificates by either of the separate component fabricator (e.g., component fabricators 106, 206) and manufacturer 306. In the exemplary embodiment, ecosystem 300 further includes an electronic device 310, into which SoC 308 is assembled and/or integrated, and a consumer 312. Also in the exemplary embodiment, CA 302 includes one or more of an OCSP responder 314, a certificate database 316, and a CRM 318.

In exemplary operation of ecosystem 300, an exemplary PKI activation and validation process begins at step S320. In step S320, manufacturer 306 assembles device 310, including SoC 308 having one or more keypairs 304/certificates inserted into SoC 308 according to process 100 or process 200. In at least one example of process 300, step S320 includes a substep in which manufacturer 306 ships device 310 to a merchant, retailer, or distributor (not shown) from which device 310 may be obtained and/or purchased by consumer 312. In step S322, device 310 is obtained/purchased by consumer 312, and in step S324, the consumer activates and/or onboards device 310. In some examples of step S324, consumer 312 activates/onboards device 310 directly through device 310. In other examples of step S324, activation/onboarding is performed through a graphical user interface (not shown) of a computing device (e.g., personal computer, tablet, smart phone, etc.—also not shown) associated with consumer 312.

In step S326, validation of one or more keypairs 304 (and certificates) is performed with CA 302. In the exemplary embodiment, the keypair/certificate validation of step S326 is performed during the activation/onboarding subprocess performed in step S324. In one example of step S326, an OCSP request message from device 310/SoC 308 to OCSP responder 314 is transmitted during the keypair/certificate validation. In another example of step S326, a specially formatted call is made to OCSP responder 314 during the keypair/certificate validation.

In step S328, OCSP responder 314 triggers a data capture mechanism of CA 302 to (i) capture registration data related to the activation/onboarding of device 310, the device manufacturing identification/status data, and the SoC/status data, and (ii) record the captured data into certificate database 316. In the exemplary embodiment, the registration data includes the date/time of registration and optionally user information, including without limitation, the name, address, email, phone number, or other contact information associated with consumer 312 (or another appropriate user). Also in the exemplary embodiment, the manufacturing identification data of device 310 may include, without limitation, the device serial number, the device batch number, the date of assembly, and/or other information identifying manufacturer 306, and the device status data may include encoded data reflecting the status of device 310, such as "onboard," "ready for use," "in use," "associated" (e.g., with consumer 312), "disassociated," "recycled/reprovisioned," "expired," etc. For example, some electronic devices 310 may be preliminarily provisioned or onboarded by manufacturer 306, but not yet associated with or activated by consumer 312. The present embodiments thus advantageously enable manufacturers to render devices into such interim or partial status conditions without incurring PKI costs until devices are fully activated by consumers.

In the exemplary embodiment, the data capture mechanism represents a modification to OCSP responder 314 that renders additional capability thereto. In one example of ecosystem 300, new and unique coding is provided inside OCSP responder 314 to enable the additional data capture and/or aggregation capabilities, without separate modifications to the protocol. In an alternative embodiment, the data capture mechanism is a separate hardware unit or software coding/subroutine within CA 302 that is in operable communication with OCSP responder 314 and certificate database 316, or the respective coding therein. Certificate database 316 may represent a single memory or storage unit, or may be a plurality of storage databases managed and/or cross-referenced by CA 302.

In step S330, the validation, activation, and registration data stored within certificate database 316 is aggregated into a billing system of CRM 318 by an aggregation mechanism thereof. In the exemplary embodiment, the aggregation mechanism represents a modification to CRM 318. In an alternative embodiment, the aggregation mechanism is a separate hardware unit or software subroutine/database within CA 302 that is in operable communication with certificate database 316 and CRM 318. In at least one example of step S330, the aggregation mechanism utilizes a table that securely associates respective public keys, digital signatures, certificate revocation statuses, registration data, validation data, and/or activation data together for appropriate invoicing by CRM 318. According to this advantageous configuration, a novel coupling of the OCSP to the backend processes is achieved. In the exemplary embodiment, new coding within OCSP responder 314 is provided to create a backchannel to CRM 318.

In step S332, CRM 318 automatically assembles an invoice for transmission to manufacturer 306 for the individual devices 310 that have been activated by respective consumers 312, with respect to ecosystem 300, during an invoice period. In at least one example of step S332, certificate authority 302 manages more than one PKI, and the assembled invoice includes billing information for activations of particular devices 310 with respect to more than one PKI ecosystem managed by CA 302. In some embodiments, CRM 318 and/or the invoice assembled in step S332 include manual processing. The assembled invoice may be transmitted to manufacturer 306 as a digital or paper billing invoice, or may represent an automated virtual online financial transaction.

The exemplary systems and methods described and illustrated herein therefore significantly increase the commercial value of PKI implementation for technology industries and individual customers. As described herein, all desired credentials can be made available in (or generated by) the SoC that becomes part of the PKI-deployed device. Customers need not individually obtain credentials for each ecosystem in which the customer seeks to subsequently associate a purchased device. Additionally, the CA that issues and manages the certificates need not charge for the use of the certificates unless the device is later actually installed (i.e., presuming a purchase), and the PKI for the pre-inserted keys and/or certificates is validated according to these advantageous techniques, the bill of materials risk to the manufacturer/integrator is eliminated, or at least significantly attenuated (as well as the associated guesswork).

Accordingly, where manufacturers/integrators may be unwilling to purchase keys for every manufactured device under conventional schemes (irrespective of whether the device is actually purchased, or sits on a shelf in a warehouse), the same manufacturers/integrators would be willing to pay a PKI fee for only those devices which our actually used under the present systems and methods. Therefore, the present embodiments function to significantly reduce the cost of implementing PKI in a variety of technology industries, while also increasing the security of the number of integrated devices from this expanded PKI desirability. It is presently estimated, for example, that the number of IoT-connected devices is over 8 billion. The number of such deployed devices is expected to increase to over 20 billion within a few years, and to over 50 billion over the next decade. The cost savings and increased security resulting from the present embodiments is therefore considerably advantageous.

The present systems and methods also further allow a manufacturer to assemble or prepare a single device that is pre-configured (e.g., keys and certificates available on the SoC at the time of manufacture) to operate within multiple anticipated ecosystems, where each ecosystem has its own PKI. Under such configurations, the manufacturer would only expect to pay for the keys/certificates within the device that are related to the PKI in which the device is actually deployed. As described above, these novel techniques are of particular value to IoT device manufacturers who desire to have devices deployable within a variety of ecosystems, such as OCF, AllSeen/AllJoyn, Nest/Thread, Zigbee. Such devices are thus readily available for deployment in any of the anticipated ecosystems, but the manufacturer will only pay for those in which the device is actually deployed, thereby realizing significant savings in the overall manufacturing costs of such devices.

Exemplary embodiments of PKI management systems and methods are described above in detail, as well as particular embodiments relating to OCSP validation techniques that trigger post hoc device registrations with the PKI. The systems and methods of this disclosure though, are not limited to only the specific embodiments described herein, but rather, the components and/or steps of their implementation may be utilized independently and separately from other components and/or steps described herein.

Bootstrapping Ecosystem Certificate Issuance Using Preinstalled PKI Certificates In an alternative embodiment, the OCSP responder is not necessary for device registration, but instead may be utilized to instantiate a secure connection from the device to the Certificate Authority. Through a software update mechanism of the device, the OCSP responder may install an appropriate ecosystem certificate during use of the device in the field, as opposed to installing that ecosystem certificate during the manufacturing or integration process.

In an exemplary embodiment, a mechanism provides a preinstalled certificate, chained to a proprietary root of trust, for deployment during the chip fabrication or device integration stage of manufacturing. The chip, SoC, or platform may then be used by multiple industries/manufacturers at each stage of the final integration of the respective devices and deployment in the field. During the integration stage, and on through deployment, such devices are enabled to request a specific ecosystem certificate according to this innovative process.

In at least some embodiments, the issuance of a particular final ecosystem certificate may be made to be contingent upon the validation of an initial bootstrapping certificate, as well as other supporting credentials. The present techniques nevertheless further allow the implementation of an economic model that reduces the costs associated with initial deployment of certificates, and that eliminates any requirement to know to which ecosystem a component of a device would be delivered and used. This improvement to the technology of the certificate issuance process further enables additional registration, billing, and ecosystem selection to be handled after the device has been deployed, that is, a post-hoc decision rather than one made a priori to manufacture.

According to the embodiments described further herein, one or more trusted bootstrapping certificates are added to the device during manufacturing, thereby avoiding the initial PKI costs, and also the conventional gamble over which certificates to store in the device. In the exemplary embodiment, by issuing the certificates at such an early manufacturing stage, the certificates will have a comparatively reduced initial cost, no direct ties to an ecosystem, and a strongly protected root CA. Exemplary techniques for issuing these certificates are described below with respect to FIG. 4.

Figure 4:
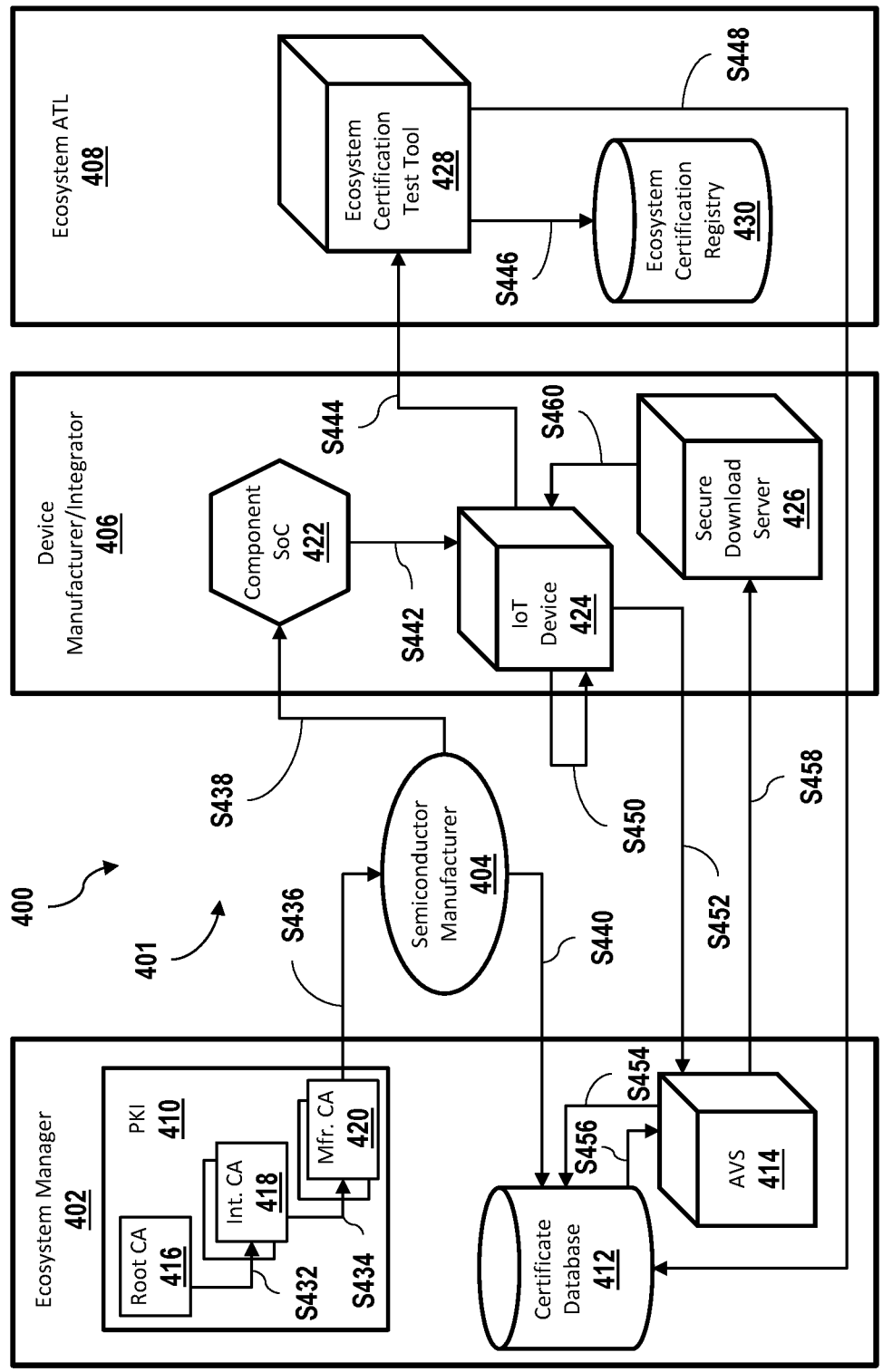
FIG. 4 is a schematic illustration of an alternative ecosystem and a bootstrapping certificate issuance process, according to an embodiment.

FIG. 4 is a schematic illustration of an alternative ecosystem 400 and a bootstrapping certificate issuance process 401. Ecosystem 400 includes an ecosystem manager 402, a semiconductor manufacturer 404, and IoT device manufacturer/integrator 406, and an ecosystem approved test lab (ATL) 408. Several of these system elements are similar to the elements described above of the same name. In the exemplary embodiment, ecosystem 400 represents a collaborative group of partners in an industry, which may be focused on one or more of supply-chain management, consumer-facing certification, standardization of interfaces, and/or portions or combinations thereof.

In an embodiment, ecosystem manager 402 represents one or more of an organization/entity inside ecosystem 400, an external entity, or another collaborative group that assists in the support of security and certificate issuance for ecosystem 400. In some embodiments, ecosystem manager 402 may have functional responsibilities beyond security and certificate issuance, but these additional functional responsibilities are not further discussed herein. In the exemplary embodiment, ecosystem manager 402 includes a PKI infrastructure 410, a certificate database 412, and an authentication and validation server (AVS) 414. In at least one embodiment, PKI infrastructure 410 includes a root CA 416, one or more intermediate CAs 418, and one or more manufacturer CAs 420.

In an embodiment, semiconductor manufacturer 404 represents an organization or entity responsible for creation of the foundational hardware (e.g., the wafer and the chip) into which the private key, the public key, and a bootstrapping certificate are inserted. In some embodiments, semiconductor manufacturer 404 is functionally responsible for security, tracking, and auditing of manufacturer CA(s) 420.

In an embodiment, IoT device manufacturer/integrator 406 includes at least one component 422 (e.g., an SoC or chip), at least one IoT device 424, and a secure download server 426. In some embodiments, IoT device manufacturer/integrator 406 is the same entity as semiconductor manufacturer 404. In other embodiments, IoT device manufacturer/integrator 406 is a separate entity from semiconductor manufacturer 404. In the exemplary embodiment, IoT device manufacturer/integrator 406 functions to integrate the foundational hardware component 422 created by semiconductor manufacturer 404, and ties/integrates component 422 into device 424. In some embodiments, IoT device manufacturer/integrator 406 is the party which will execute certificate issuance process 401.

In an embodiment, ecosystem ATL 408 includes an ecosystem certification test tool 428 and an ecosystem certification registry 430. In operation, ecosystem ATL 408 is functionally responsible for testing samples of devices 424 from IoT device manufacturer/integrator 406, in order to confirm compliance with standards accepted and enforced by ecosystem 400. In some embodiments, testing of devices 424 by ecosystem ATL 408 is automated. In further operation, when failures are encountered, IoT device manufacturer/integrator 406 or semiconductor manufacturer 404 may implement changes or corrective measures to confirm compliance of device 424 prior to resubmission for testing. Upon successful completion of the tests, ecosystem ATL 408 records the testing results in ecosystem certification registry 430. In at least one embodiment, ecosystem ATL 408 additionally conveys information regarding the testing results to ecosystem manager 402.

Exemplary operation of bootstrapping certificate issuance process 401 is described further below with reference to ecosystem 400. Process 401 begins at step S432, in which the creation of top-level root CA 416 corresponds with the creation of the public key, private key, and root certificate (not individually shown). Whereas the root private key is heavily protected, the root certificate is published so that it can be readily used to verify other certificates that are chained to the root certificate from intermediate CAs 418.

In step S434, intermediate CAs 418 are created and chained to root CA 416. Intermediate CAs 418 may then be used to create manufacturer CAs 420 (also referred to as bootstrapping CAs). In at least one embodiment, intermediate CAs 418 are associated with certificate issuance within a given ecosystem 400, and manufacturer/bootstrapping CAs 420 are used to create the bootstrapping certificates. In an embodiment of step S434, for intermediate CAs 418, the private key is heavily protected, whereas the certificate is published so that manufacturer CAs 420 can chain to intermediate CAs 418.

In step S436, the private keys for bootstrapping CAs 420 are protected by semiconductor manufacturer 404, and the bootstrapping certificates are published so that all bootstrapping certificates can chain first to bootstrapping CA 420, then to intermediate CA 418, and finally to root CA 416. In some embodiments of step S436, more or fewer intermediate CAs 418 may be included in this chain.

In step S438, semiconductor manufacturer 404 creates and inserts the certificates and public key into component 422 (e.g., SoC, chip, and/or wafer). In an exemplary embodiment, the private key associated with this inserted certificate is stored in a protected area of the component 422 (e.g., a trusted platform module (TPM) of the chip, or similar). In some embodiments of step S438, the certificates for each CA 416, 418, 420 in the chain, that is, between and including the bootstrapping certificate from bootstrapping CA 420 and root CA 416, are optionally included in the trust store for component/chip 422. In an alternative embodiment, the certificates are not included, and semiconductor manufacturer notifies ecosystem manager 402 of each certificate issued to verify the authentication of the particular chip 422.

In step S440, semiconductor manufacturer 404 communicates with ecosystem manager 402 to confirm that a bootstrapping certificate is sent and stored in certificate database 412. In an embodiment of step S440, semiconductor manufacturer 404 communicates with ecosystem manager 402 over an encrypted channel (not shown), based on the private key of manufacturer CA 420.

In step S442, chips 422 that are provisioned with bootstrap certificates are designed and/or integrated into IoT devices 424 by IoT device manufacturer/integrator 406. In step S444, IoT devices 424 are submitted by IoT device manufacturer/integrator 406 to ecosystem ATL 408 for testing and certification. In exemplary operation of step S444, in the event of test failures, step S444 is repeated after changes are made in IoT device 424, the silicon of component 422, and/or the firmware/software thereof. In the exemplary embodiment, steps S446 and beyond occur only after testing is successfully completed in step S444.

In step S446, a certificate is issued and registered for each IoT device 424 passing the testing regimen of ecosystem ATL 408. In step S448, ecosystem manager 402 is informed by ecosystem ATL 408 of each IoT device 424 passing the relevant testing and being certified for a particular ecosystem 400.

In step S450, certificate issuance process 401 provisions IoT device 424 for the particular ecosystem 400. In exemplary operation of step S450, IoT device 424 includes an API with the capability to trigger the provisioning, such as by a button, a jumper, and/or an encrypted command, etc. (not shown). Alternatively, IoT device 424 is in operable communication with a trusted partner device (not shown) configured to manage process 401 and step S450 for the particular IoT device 424, such as in the case of a heavily constrained device. In further operation of step S450, upon triggering, IoT device 424 formulates a request to provision the particular ecosystem certificate. In some embodiments, this request may originate from IoT device 424 itself. In other embodiments, the request is initiated from another connected device (not shown) having permissions to request the provisioning. In the exemplary operation of step S450, provisioning occurs during the silicon formation of component 422, the integration or manufacturing of component 422 into IoT device 424, or the field deployment of IoT device 424 based on the provisioning support available to the device.

In step S452, IoT device 424 signals its readiness for an ecosystem certificate to AVS 414. In exemplary operation of step S452, AVS 414 functionally operates similar to an OCSP responder to receive the request or requests. In this embodiment, the received request includes one or more of: (a) the bootstrapping certificate; (b) an indication of the desired ecosystem 400 (optional, in the case where ecosystem 400 is defined by AVS 414 or certificate database 412); (c) the public key; (d) proof of the private key (e.g., through a digitally signed message, or by decrypting a message encrypted using the associated public key); and (e) an indicator for a mechanism supported for issuance of the ecosystem certificate, such as a secure software download, a certificate signing request (CSR), an encrypted package deployment, or the like.

In step S454, AVS 414 communicates with certificate database 412, and validates that one or more of the following conditions are true for IoT device 424: (a) the bootstrapping certificate was issued; (b) the bootstrapping certificate is presently valid (e.g., within a validity period of the certificate); (c) the bootstrapping certificate has not been revoked; (d) the bootstrapping certificate is trusted for the desired ecosystem 400; (e) the desired ecosystem 400 is presently allowing bootstrapping certificate issuance; (f) predetermined financial obligations have been met with respect to the ecosystem certificate issuance (e.g., whether a purchase order mechanism exists, a prepayment has been made, an immediate fund transfer is established, a credit or credit line is provided, etc.); and (g) the mechanism supported by IoT device 424 is presently supported for ecosystem certificate issuance (including protocol versioning). In an exemplary embodiment of step S454, AVS 414 validates all of conditions (a) through (g).

In step S456, after the validation of the request in step S454, certificate database 412 and AVS 414 collectively log the request as being successful or failed. In the case of a successful request, in step S458, the CSR (or equivalent mechanism) is engaged by AVS 414, and AVS 414 issues a new certificate, or alternatively, a pre-issued certificate from storage or a cache (not shown). In either case, AVS 414 is configured to build a package for the ecosystem certificate that contains one or more of (i) the private key for the ecosystem certificate, (ii) the public key for the ecosystem certificate, and (iii) the ecosystem certificate, including a validity period compliant with requirements of ecosystem 400. In some embodiments of step S458, the package includes additional optional parameters. The package is then encrypted using the public key of the requesting device (i.e., IoT device 424) and the private key of AVS 414, and the encrypted package is sent to secure download server 426.

In step S460, the encrypted package is delivered by secure download server 426 to IoT device 424. In an alternative embodiment, the encrypted package is sent directly from AVS 414 to an equivalent software/certificate deployment architecture consistent with the device being managed (i.e., IoT device 424). In this alternative embodiment, the relevant mechanism is direct to device 424, as opposed to being routed through the manufacturer (e.g., 404 and/or 406) and the secure software update mechanism thereof (e.g., in secure download server 426). In at least one embodiment, a specialized API of IoT device 424 cooperates with the TPM to receive the encrypted package. In further operation of step S460, within the secure execution environment (SEE) of the TPM, the encrypted package is decrypted using the public key for root CA 416 (i.e., which will have been already loaded into the trust store for IoT device 424) and the private key associated with the bootstrapping certificate. In further exemplary operation, also within the TPM, the private key for the bootstrapping certificate is securely stored, and does not leave the TPM in non-ciphertext. The SEE then communicates a new ecosystem certificate and the public key from the ecosystem certificate package, and the new ecosystem certificate is stored with other certificates. The public key is stored with other public keys needed or accessed by IoT device 424.

In some embodiments, AVS 414 optionally notifies ecosystem ATL 408 of each IoT device 424 being provisioned in the field. In this optional case, ecosystem certification registry 430 (or another data store) stores the certifications of which it is notified. In one example of this embodiment, a provisioning notification is sent to a Cloud service provider (not shown), which may also be in operable communication with AVS 414, for ongoing authentication and device management.

According to the advantageous embodiments described above, more universally trusted credentials may be installed at the time of manufacturing, and new credentials can be applied based on the trusted credentials. In conventional systems, even where credentials are made available in the SoC used within the device, the costs of installing the credentials early in the manufacturing process can be dramatic, as described above. That is, in the case where a single conventional SoC can be used for multiple purposes, requiring credentials for multiple industries each having its own credentialing ecosystem, the manufacturer is conventionally required to pay for and install all required certificates at the time of manufacture. In actual use, however, the device installed with several credentials may only use one such credential because a final ecosystem might only rely on its own credentialing requirements.

Thus, when each anticipated credential is expensive to provide, manufacturers will often avoid the gamble of conventional PKI infrastructure schemes, and choose a less-secure, but less expensive, credentialing scheme. According to the present systems and methods though, this conflict is resolved through the implementation of a bootstrapping credential that is installed at the time of manufacturing and trusted by the several ecosystems. Devices manufactured thereby are configured to include an API through which new credentials may then be later applied (e.g., using a secure software update mechanism). According to these advantageous techniques, the several ecosystems are provided with trusted devices, the SoC manufacturers have a process to pre-provision devices/SoCs for the multiple ecosystems, and the device integrators/sellers avoid the gamble of the conventional PKI infrastructure schemes. Costs remain low, and the risk of purchasing certificates and credentials ahead of time is reduced.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for managing a public key infrastructure (PKI) for an electronic device configured for use within a first PKI ecosystem and a second PKI ecosystem different from the first PKI ecosystem, comprising:
    an ecosystem manager configured to create a root PKI keypair, a root certificate, and a bootstrapping certificate chained to the root certificate;
    at least one silicon component integrated into the electronic device by a device manufacturer the at least one silicon component including a public key of the root PKI keypair and the bootstrapping certificate; and
    an ecosystem approved test lab (ATL) configured to (i) test the electronic device having the integrated silicon component, the public key, (ii) confirm that the bootstrapping certificate complies with first predetermined standards of the first PKI ecosystem and with second predetermined standards of the second PKI ecosystem, and (iii) certifying the electronic device as ready for provisioning in the first and second PKI ecosystems,
    wherein the ecosystem manager is further configured to, in response to a provisioning request from the electronic device, (i) issue a first ecosystem certificate to the electronic device for deployment of the electronic device in the first PKI ecosystem, and (ii) withhold issuance of a second ecosystem certificate for deployment of the electronic device in the second PKI ecosystem, and
    wherein the provisioning request includes the bootstrapping certificate and one or more of (i) an identification of the first ecosystem, (ii) the public key, (iii) proof of a private key of the root PKI keypair, and (iv) an indicator for a mechanism supported by the first PKI ecosystem for issuance of the first ecosystem certificate.

2. The system of claim 1, wherein the at least one silicon component comprises one or more of a system on a chip (SoC), an electronic chip, and a silicon wafer.

3. The system of claim 1, wherein the ecosystem manager comprises a PKI infrastructure including a root certificate authority (CA), at least one intermediate CA, and a bootstrapping CA.

4. The system of claim 3, wherein the root CA is configured to generate the root PKI keypair for installation on, or encoding within, the silicon component.

5. The system of claim 4, wherein the root CA is further configured to generate the root certificate.

6. The system of claim 5, wherein the at least one intermediate CA is configured to chain to the root CA and publish the root certificate such that the bootstrapping CA may chain to the at least one intermediate CA.

7. The system of claim 3, wherein the ecosystem manager further comprises a certificate database and an authentication and validation server (AVS).

8. The system of claim 7, wherein the AVS is configured to receive the provisioning request from the electronic device.

9. The system of claim 1, wherein the proof of the private key includes one or more of a digital signature and a decryption of an encrypted message.

10. The system of claim 1, wherein the indicator for the mechanism includes one or more of a secure software download, a certificate signing request, and an encrypted package deployment.

11. The system of claim 1, wherein the AVS is further configured to validate one or more of (i) the bootstrapping certificate was issued, (ii) the bootstrapping certificate is presently valid, (iii) the bootstrapping certificate has not been revoked, (iv) the bootstrapping certificate is trusted for the first PKI ecosystem, (v) the first PKI ecosystem is presently allowing bootstrapping certificate issuance, (vi), predetermined financial obligations have been met to allow for the first ecosystem certificate issuance, and (vii) the mechanism is presently supported.

12. The system of claim 1, further including a semiconductor manufacturer configured to create the at least one silicon component.

13. The system of claim 12, wherein the device manufacturer includes the semiconductor manufacturer.

14. A method for issuing a bootstrapping certificate for an electronic device in a first public key infrastructure (PKI) ecosystem in which the electronic device may be deployed and a different second PKI ecosystem in which the electronic device may be deployed, the method comprising the steps of:
    generating a root PKI keypair and a root certificate, wherein the root PKI keypair includes a public key and a private key;
    chaining at least one bootstrapping certificate to the root certificate;
    inserting the bootstrapping certificate and the public key into a silicon component;

integrating the silicon component into the electronic device;

testing the electronic device to certify that the inserted bootstrapping certificate is valid;

provisioning the electronic device having a certified bootstrapping certificate for deployment in the first ecosystem and in the second ecosystem, wherein the step of provisioning includes (i) a first request for issuance of a first ecosystem certificate for deployment within the first PKI ecosystem, and (ii) a second request, different from the first request, for issuance of a second ecosystem certificate for deployment within the second PKI ecosystem;

issuing, in response to the first request, a first ecosystem certificate based on the certified bootstrapping certificate; and denying, in response to the second request, issuance of the second ecosystem certificate.

15. The method of claim 14, wherein the step of inserting comprises inserting the private key into a protected area of the silicon component.

16. The method of claim 15, wherein the protected area comprises a trusted platform module of an electronic chip.

17. The method of claim 14, further comprising, after the step of inserting, the step of notifying an ecosystem manager of the successful insertion of the bootstrapping certificate.

18. The method of claim 17, wherein the step of notifying is performed over an encrypted channel based on the private key.

19. The method of claim 14, wherein the electronic device is an Internet of things (IoT) device, and wherein the IoT device includes at least one application programming interface capable of triggering the step of provisioning.

* * * * *